United States Patent [19]

Sato et al.

[11] Patent Number: 5,200,896
[45] Date of Patent: Apr. 6, 1993

[54] METHOD FOR ESTIMATING LONGITUDINAL ACCELERATION OR DECELERATION OF A VEHICLE BODY

[75] Inventors: Makoto Sato; Hiromi Inagaki, both of Wako, Japan

[73] Assignee: Honda Giken Kogyo Kabushiki Kaisha, Tokyo, Japan

[21] Appl. No.: 578,112

[22] Filed: Sep. 6, 1990

[30] Foreign Application Priority Data

Sep. 7, 1989 [JP] Japan .................................. 1-232325

[51] Int. Cl.⁵ .............................................. G01P 15/00
[52] U.S. Cl. .......................... 364/426.01; 364/426.02; 364/566; 324/162; 73/510
[58] Field of Search .............. 364/566, 426.01, 426.02, 364/424.05, 571.01, 571.02; 324/162; 73/507, 510; 180/197; 303/97, 99, 105, 107, 108

[56] References Cited

U.S. PATENT DOCUMENTS

| | | | |
|---|---|---|---|
| 4,114,450 | 9/1978 | Shulman et al. | 364/566 |
| 4,841,446 | 6/1989 | Leiber et al. | 364/426.01 |
| 4,896,268 | 1/1990 | MacGugan | 73/510 |
| 4,900,100 | 2/1990 | Higashimata et al. | 364/426.02 |
| 4,908,767 | 3/1990 | Scholl et al. | 73/510 |

*Primary Examiner*—Gary Chin
*Attorney, Agent, or Firm*—Armstrong, Westerman, Hattori, McLeland & Naughton

[57] ABSTRACT

With the method of the present invention, a detected value in the longitudinal acceleration-deceleration detector can be corrected for a gradient of a slope acting on the detector when the vehicle is traveling on a sloped road surface. Assuming that a vehicle is traveling on an upward slope or a downward slope, a value in a vertical acceleration-deceleration detector is detected. A determination is made as to whether the vehicle is traveling on the upward or downward slope using a corrected value which is closest to a pseudo-acceleration or deceleration based on wheel speeds. This enables a more accurate estimation of the longitudinal acceleration or deceleration by using the corrected value which is closest to the pseudo-acceleration or deceleration.

5 Claims, 3 Drawing Sheets

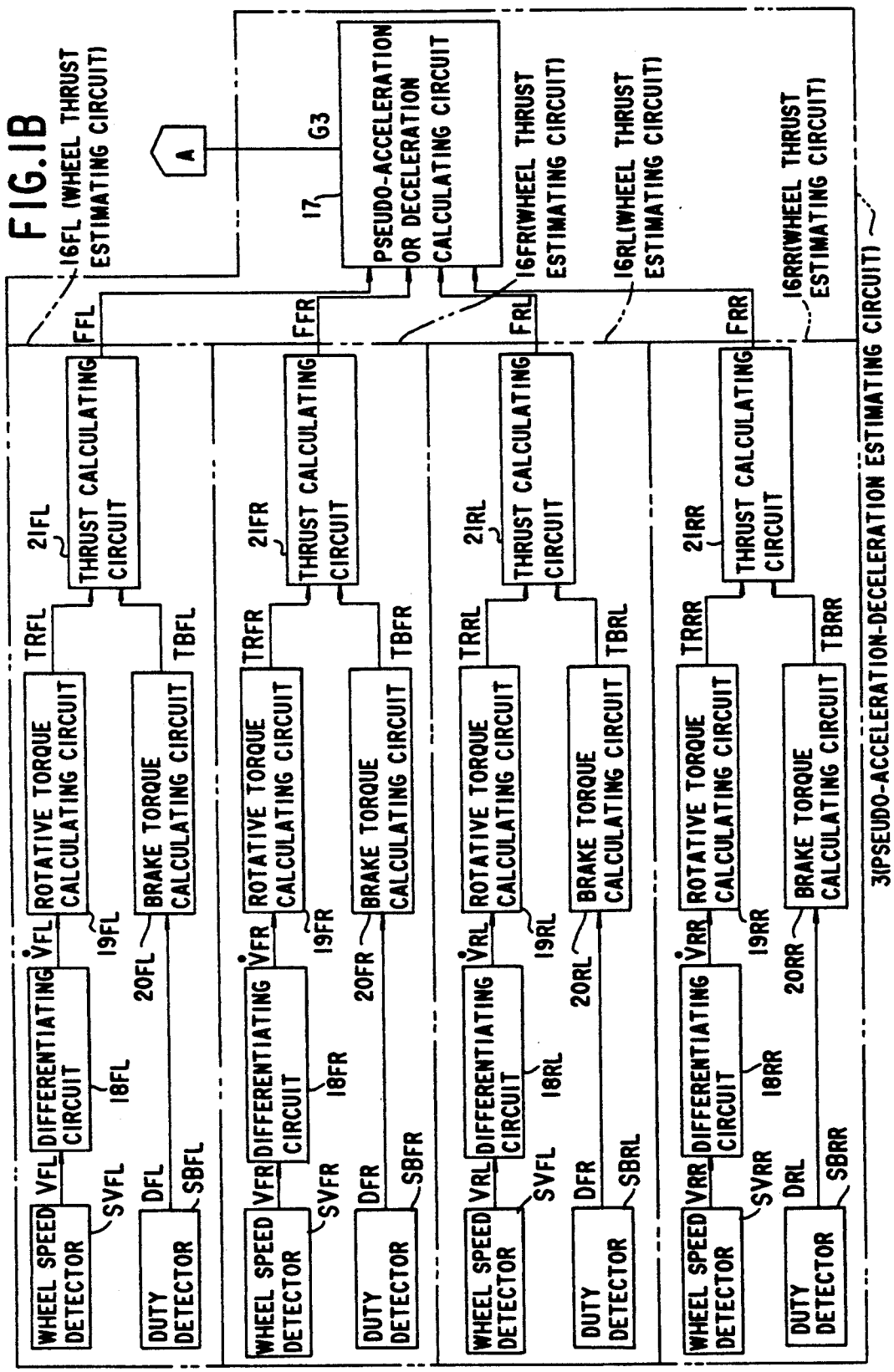

METHOD FOR ESTIMATING LONGITUDINAL ACCELERATION OR DECELERATION OF A VEHICLE BODY

FIELD OF THE INVENTION

The present invention relates to a method for estimating longitudinal acceleration or deceleration of a vehicle body.

BACKGROUND OF THE INVENTION

In a vehicle equipped with an anti-lock brake control device, a reference value for determining whether or not a wheel is about to become locked during braking is conventionally provided from a vehicle speed which is estimated based on detected values from wheel speed detectors, as disclosed in Japanese Patent Application Laid-Open No. 184558/88.

The estimation of the vehicle speed using the detected values from the wheel speed detectors, as described above, is not very accurate. If the vehicle speed is, instead, estimated from a detected value from an acceleration-deceleration detector mounted on the vehicle body, it is possible to estimate the vehicle speed reliably and accurately.

The vehicle may travel not only on a flat road surface but also on an upward or downward slope. While traveling on an upward or downward slope, an effect corresponding to a gradient is exerted on the detected value in the acceleration-deceleration detector which will effect the accuracy of the detected value.

SUMMARY OF THE INVENTION

It is an object of the present invention to provide a method for estimating a longitudinal acceleration or deceleration of a vehicle body, wherein any effect of a gradient, from traveling on a sloped road surface, can be eliminated so that an estimated longitudinal acceleration or deceleration of the vehicle body is accurate.

A method according to the present invention includes, first, determining a longitudinal value from a longitudinal acceleration-deceleration detector. The detector is mounted on the vehicle body to detect an acceleration or deceleration of the vehicle body in a longitudinal direction. The longitudinal value is corrected based on a detected value from a vertical acceleration-deceleration detector. Traveling of the vehicle, on an upward or downward slope, is estimated based on the detected value from the vertical acceleration-deceleration detector. The vertical acceleration-deceleration detector is mounted on the vehicle body to detect an acceleration or deceleration of the vehicle body in a vertical direction perpendicular to the longitudinal direction. A longitudinal acceleration or deceleration of the vehicle body is established as one of a) a first corrected acceleration or deceleration, corresponding to the upward slope, and b) a second corrected acceleration or deceleration, corresponding to the downward slope. The corrected acceleration or deceleration which is closest to a pseudo-acceleration or deceleration is then selected as the acceleration or deceleration. The pseudo-acceleration is estimated based on detected values in wheel speed detectors mounted on the wheels on the vehicle.

With the above method, the detected value in the longitudinal acceleration-deceleration detector can be corrected for any error that occurs when a vehicle is traveling on an upward or downward slope by a value detected in the vertical acceleration-deceleration detector. A determination is made as to which of the upward or downward slopes the vehicle is traveling on using a corrected value which is closest to the pseudo-acceleration or deceleration based on the wheel speeds. This enables a more accurate estimation of the longitudinal acceleration or deceleration by using the corrected value which is closest to the pseudo-acceleration or deceleration.

BRIEF DESCRIPTION OF THE DRAWINGS

The drawings illustrate one embodiment of the present invention, wherein

FIGS. 1A–1B are circuit block diagrams illustrating the present invention;

DESCRIPTION OF THE PREFERRED EMBODIMENT

Figure 1A:
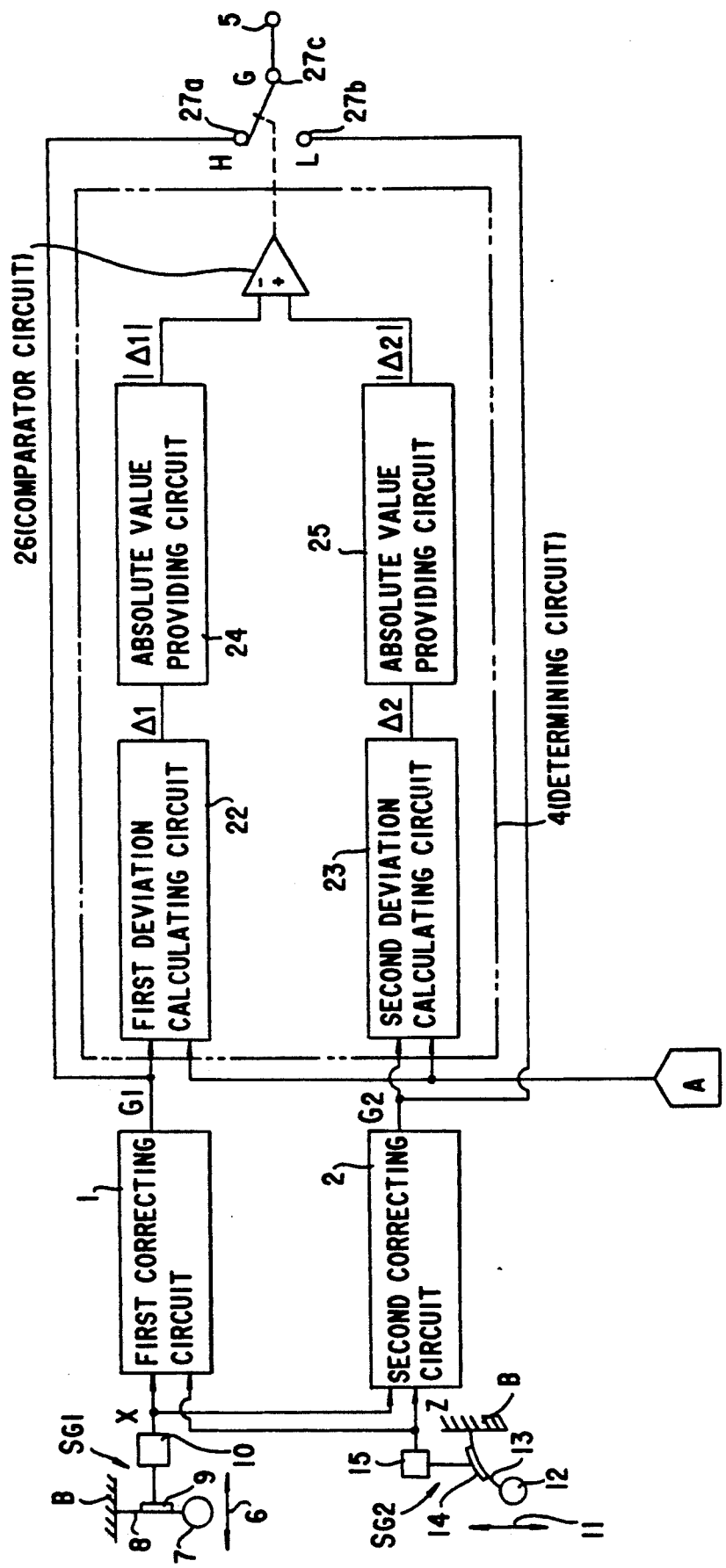

The present invention will now be described by way of one embodiment with reference to the accompanying drawings. First referring to FIG. 1, a vehicle body B includes a longitudinal acceleration-deceleration detector $S_{G1}$ mounted thereon to detect longitudinal acceleration or deceleration. A vertical acceleration-deceleration detector $S_{G2}$ is mounted to the vehicle body to detect vertical acceleration or deceleration. A detected value X in the longitudinal acceleration-deceleration detector $S_{G1}$ is corrected based on a detected value Z from the vertical acceleration-deceleration detector $S_{G2}$ in a first correcting circuit 1 which is provided to estimate traveling of a vehicle on an upward slope. The detected value X is also corrected based on the detected value Z in a second correcting circuit 2 which is provided to estimate traveling of the vehicle on a downward slope. A pseudo-acceleration or deceleration G3 is estimated in a pseudo-acceleration-deceleration estimating circuit 3 based on wheel speeds $V_{FL}$, $V_{FR}$, $V_{RL}$ and $V_{RR}$. A determining circuit 4 determines which of the a) first corrected acceleration or deceleration G1 obtained in the first correcting circuit 1 or b) a second corrected acceleration or deceleration G2 provided in the second correcting circuit 2 is closer to the pseudo-acceleration or deceleration G3. One of the corrected accelerations or decelerations G1 and G2 which is closest to the pseudo-acceleration or deceleration G3 is output from an output terminal 5 as a longitudinal acceleration or deceleration G of the vehicle body B.

The longitudinal acceleration-deceleration detector $S_{G1}$ is mounted on the vehicle body B to detect an acceleration or deceleration in a longitudinal direction as indicated by arrow 6. The detector $S_{G1}$ includes a leaf spring 8 which has a weight 7 mounted on a leading end and which is secured at a base end to the vehicle body B. A strain gauge 9 is bonded on a surface of the leaf spring 8. A detector 10 detects a variation in resistance of the strain gauge 9. The detector $S_{G1}$ is mounted so that the amount of deflection of the leaf spring 8 varies in accordance with a variation in acceleration or deceleration in the longitudinal direction 6. The detected value X in the longitudinal acceleration-deceleration detector $S_{G1}$ is input to the first and second correcting circuits 1 and 2.

The vertical acceleration-deceleration detector $S_{G2}$ is mounted on the vehicle body B to detect an acceleration or deceleration in a vertical direction (as indicated by arrow 11) which is perpendicular to the longitudinal direction 6. The detector $S_{G2}$ includes a leaf spring 13 which has a weight 12 mounted at a leading end and is secured at a base end to the vehicle body B. A strain gauge 14 is bonded on a surface of the leaf spring 13. A detector 15 detects a variation in resistance of the strain gauge 14. The detector $S_{G2}$ is mounted so that the amount of deflection of the leaf spring 13 varies in accordance with a variation in acceleration or deceleration in a vertical direction 11. The detected value Z in the vertical acceleration-deceleration detector $S_{G2}$ is input to the first and second correcting circuits 1 and 2.

The first correcting circuit 1 is to correct the detected value X in the longitudinal acceleration-deceleration detector $S_{G1}$ based on the detected value Z in the vertical acceleration-deceleration detector $S_{G2}$. Assuming that the vehicle is traveling on an upward slope, a calculation is carried out in first correcting circuit 1 according to the following equation (1) to provide a first corrected acceleration or deceleration G1:

$$G1 = X + (1 - Z^2)^{\frac{1}{2}} \quad (1)$$

Figure 2:
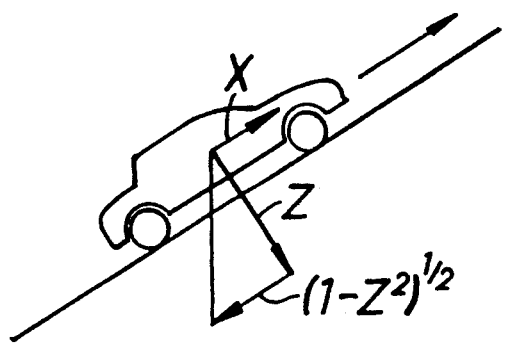
FIG. 2 is a diagram explaining the effect of a gradient during traveling on an upward slope.

During traveling of the vehicle body B on the upward slope, an effect corresponding to a gradient of the slope acts on the detected value X in the longitudinal acceleration-deceleration detector $S_{G1}$ toward a minus side, as shown in FIG. 2. With the calculation according to equation (1), the effect corresponds to the gradient being defined as $(1-Z^2)^{\frac{1}{2}}$ based on the detected value Z in the vertical acceleration-deceleration detector $S_{G2}$. The longitudinal acceleration or deceleration during the time the vehicle is traveling on the upward slope can be output as a first corrected acceleration or deceleration G1.

The second correcting circuit 2 is to correct the detected value X in the longitudinal acceleration-deceleration detector $S_{G1}$ based on the detected value Z in the vertical acceleration-deceleration detector $S_{G2}$. Assuming that the vehicle is traveling on a downward slope, a calculation is carried out in the second correcting circuit 2 according to the following equation (2) to provide a second corrected acceleration or deceleration G2:

$$G2 = X + (1 - Z^2)^{\frac{1}{2}} \quad (2)$$

Figure 3:
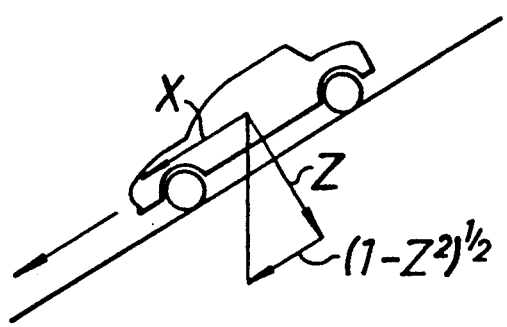
FIG. 3 is a diagram explaining the effect of a gradient during traveling on a downward slope.

During traveling of the vehicle body B on the downward slope, an effect corresponding to a gradient of the slope acts on the detected value X in the longitudinal acceleration-deceleration detector $S_{G1}$ toward a plus side, as shown in FIG. 3. With the calculation according to equation (2), the effect corresponds to the gradient being defined as $(1-Z^2)^{\frac{1}{2}}$ based on the detected value Z in the vertical acceleration-deceleration detector $S_{G2}$. The longitudinal acceleration-deceleration during the time the vehicle is traveling on the downward slope can be output as a second corrected acceleration-deceleration G2.

The pseudo-acceleration-deceleration estimating circuit 3 comprises wheel thrust estimating circuits $16_{FL}$, $16_{FR}$, $16_{RL}$ and $16_{RR}$ independently associated with left and right front wheels and left and right rear wheels of the vehicle, respectively. A pseudo-acceleration-deceleration calculating circuit 17 is common to the wheel thrust estimating circuits $16_{FL}$ to $16_{RR}$. The individual wheel thrust estimating circuits $16_{FL}$ to $16_{RR}$ have the same construction and hence, only the construction of the wheel thrust estimating circuit $16_{FL}$ for the left front wheel will be described. The other wheel thrust estimating circuits $16_{FR}$, $16_{RL}$ and $16_{RR}$ are only shown by corresponding reference characters with suffixes FR, RL and RR attached thereto.

The wheel thrust estimating circuit $16_{FL}$ comprises a wheel speed detector $SV_{FL}$ for detecting the left front wheel speed $V_{FL}$. A differentiating circuit $18_{FL}$ differentiates the left front wheel speed $V_{FL}$ to provide a wheel acceleration or deceleration $\dot{V}_{FL}$. A rotative torque calculating circuit $19_{FL}$ calculates the rotative torque $TR_{FL}$ of the left front wheel based on the wheel acceleration or deceleration $\dot{V}_{FL}$. A duty detector $SB_{FL}$ detects a brake duty $D_{FL}$, e.g., a hydraulic braking pressure in a left front wheel brake (not shown). A brake torque calculating circuit $20_{FL}$ calculates a brake torque $TB_{FL}$ of the wheel based on the brake duty $D_{FL}$. A thrust calculating circuit $21_{FL}$ calculates a thrust $F_{FL}$ of the wheel based on the rotative torque $TR_{FL}$ and the brake torque $TB_{FL}$.

In the rotative torque calculating circuit $19_{FL}$, the rotative torque $TR_{FL}$ is calculated from the wheel acceleration or deceleration $\dot{V}_{FL}$, an inertia moment I of the left front wheel and a rotational radius R of the wheel according to the following equation (3):

$$TR_{FL} = \dot{V}_{FL} \times (I/R) \quad (3)$$

In the brake torque calculating circuit $20_{FL}$, the brake torque $TB_{FL}$ is calculated according to the following equation (4) using the brake duty $D_{FL}$ and a brake torque constant $K_T$ which has been previously determined:

$$TB_{FL} = D_{FL} \times K_T \quad (4)$$

In the thrust calculating circuit $21_{FL}$, a left front wheel thrust $F_{FL}$ is calculated according to the following equation (5):

$$F_{FL} = (TR_{FL} + TB_{FL})/R \quad (5)$$

In this way, a thrust $F_{FL}$ of the left front wheel is output in the wheel thrust estimating circuit $16_{FL}$, and thrusts $F_{FR}$, $F_{RL}$ and $R_{RR}$ of the right front wheel, the left rear wheel and the right rear wheel are likewise output in the wheel thrust estimating circuits $16_{FR}$, $16_{RL}$ and $16_{RR}$, respectively. The thrusts $F_{FL}$, $F_{FR}$, $F_{RL}$ and $F_{RR}$ of the wheels are input to the pseudo-acceleration-deceleration calculating circuit 17.

In the pseudo-acceleration or deceleration calculating circuit 17, the pseudo-acceleration or deceleration G3 is calculated according to the following equation (6) using the sum of the thrusts of all the wheels F $(=F_{FL}+F_{FR}+F_{RL}+F_{RR})$ and a mass M of the vehicle body:

$$G3 = F/(9.8 \times M) \quad (6)$$

The pseudo-acceleration or deceleration G3 obtained in this way is not a highly accurate estimate, and has an approximate value obtained as an acceleration or deceleration in the longitudinal direction 6 of the vehicle body B.

The pseudo-acceleration or deceleration G3 obtained in the pseudo-acceleration-deceleration estimating circuit 3 is supplied into the determining circuit 4 along with the first and second corrected accelerations or decelerations G1 and G2 obtained in the first and second correcting circuits 1 and 2.

The determining circuit 4 comprises a first deviation calculating circuit 22, a second deviation calculating circuit 23, absolute value providing circuits 24 and 25, and a comparator circuit 26.

In the first deviation calculating circuit 22, a deviation $\Delta_1$ between the first corrected acceleration or deceleration G1 and the pseudo-acceleration or deceleration G3 is calculated according to the following equation (7):

$$\Delta_1 = G1 - G3 \tag{7}$$

In the second deviation calculating circuit 23, a deviation $\Delta_2$ between the second corrected acceleration or deceleration G2 and the psuedo-acceleration or deceleration G3 is calculated according to the following equation (8):

$$\Delta_2 = G2 - G3 \tag{8}$$

In the subsequent absolute value providing circuits 24 and 25, the deviations $\Delta_1$ and $\Delta_2$ are turned into absolute values ($|\Delta_1|$ and $|\Delta_2|$). The absolute value $|\Delta_1|$ is input to an inverted input terminal of the comparator circuit 26, and the absolute value $|\Delta_2|$ is input to a non-inverted input terminal of the comparator circuit 26. If $|\Delta_2| > |\Delta_1|$, i.e., if the first corrected acceleration or deceleration G1 is closer to the pseudo-acceleration or deceleration G3 than the second correction acceleration or deceleration G2, the comparator circuit 26 produces a higher level signal. The output signal from the comparator circuit 26 causes the switching mode of a switch 27 to be changed.

The switch 27 includes a pair of separate contacts 27a and 27b and a common contact 27c. One of the contacts 27a is connected to the first correcting circuit 1, while the other 27b is connected to the second correcting circuit 2. The common contact 27c is connected to an output terminal 5. The switch 27 is arranged so that the separate contact 27a is electrically connected to the common contact 27c in response to the output from the comparator circuit 26 becoming a high level signal. The separate contact 27b is electrically connected to the common contact 27c is response to the output from the comparator circuit 26 becoming a low level signal.

When the first corrected acceleration or deceleration G1 is closer to the pseudo-acceleration or deceleration G3 than the second corrected acceleration or deceleration G2, the first correcting circuit 1 is electrically connected to the output terminal 5 in response to the output from the comparator circuit 26 becoming the high level signal. When the second corrected acceleration or deceleration G2 is closer to the pseudo-acceleration or deceleration G3 than the first corrected acceleration or deceleration G1, the second correcting circuit 2 is electrically connected to the output terminal 5 in response to the output from the comparator circuit 26 becoming the low level signal.

The operation of this embodiment will be described below. Assume that the vehicle is traveling on an upward slope and a downward slope. The detected value X in the longitudinal acceleration-deceleration detector $S_{G1}$ can be corrected based on the detected value Z in the vertical acceleration-deceleration detector $S_{G2}$, thereby providing a first corrected acceleration or deceleration G1 corresponding to the upward slope and providing a second corrected acceleration or deceleration G2 corresponding to the downward slope. Whether the vehicle is traveling on an upward or downward slope is determined by comparing which of the corrected accelerations or decelerations G1 and G2 is closer to the pseudo-acceleration or deceleration G3 obtained based on the wheel speeds $V_{FL}$, $V_{FR}$, $V_{RL}$ and $V_{RR}$. The corrected value closest to the pseudo-acceleration or deceleration G3 is delivered as a longitudinal acceleration or deceleration G from the output terminal 5 based on the result of the determination of the determining circuit 4. Accordingly, the estimation of an exact longitudinal acceleration or deceleration is possible by taking into account the effect of the gradient of the upward or downward slope.

As discussed above, according to the present invention, the detected value in the longitudinal acceleration-deceleration detector mounted on the vehicle body to detect the acceleration or deceleration of the vehicle body in the longitudinal direction is corrected by assuming that the vehicle is traveling an upward or downward slope. A detected value Z is detected from the vertical acceleration-deceleration detector $S_{G2}$ which is mounted on the vehicle body to detect the acceleration or deceleration in the vertical direction. The longitudinal acceleration or deceleration of the vehicle body can be established as one of a) a first corrected acceleration or deceleration, corresponding to the upward slope, and b) a second corrected acceleration or deceleration corresponding to the downward slope. The longitudinal acceleration or deceleration is determined by the corrected value which is closest to a pseudo-acceleration or deceleration which is based on the detected values in the wheel speed detectors mounted on the wheels. Therefore, the effect of the gradient of the upward or downward slope can be eliminated to provide an exact estimation of the longitudinal acceleration or deceleration.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method for estimating a longitudinal acceleration or deceleration of a vehicle body, comprising the steps of:

providing a longitudinal acceleration-deceleration detector which is mounted on the vehicle body to detect an acceleration or deceleration of the vehicle body in a longitudinal direction;

detecting a longitudinal detected value using said longitudinal acceleration-deceleration detector;

providing a vertical acceleration-deceleration detector which is mounted on the vehicle body to detect an acceleration or deceleration of the vehicle body in a vertical direction;

detecting a vertical detected value using said vertical acceleration-deceleration detector;

providing first and second correcting circuit means each receiving said longitudinal detected value and said vertical detected value, for respectively producing signals representing first and second corrected acceleration values, wherein said first corrected acceleration value represents a corrected longitudinal detected value when the vehicle body is on an upward sloped gradient, and wherein said second corrected acceleration value represents a corrected longitudinal detected value when the vehicle body is on a downward sloped gradient;

using said first and second correcting circuits for respectively determining said first and second corrected acceleration values based on said longitudinal and vertical detected values for both an upward sloped gradient and a downward sloped gradient; and providing at least one wheel speed sensor for sensing a speed of a wheel;

using said at least one wheel speed sensor to produce an output signal representing wheel speed of said sensed wheel;

providing at least one signal representing brake duty;

providing a pseudo-acceleration determining means for determining a pseudo-acceleration of the vehicle body from said at least one wheel sensor and from said at least one signal representing brake duty;

using said pseudo-acceleration determining means to determine said pseudo-acceleration of the vehicle body from the output of said at least one wheel sensor and from said at least one signal representing brake duty;

providing a switch for selectively causing an output terminal to receive only one of said first and second corrected acceleration values;

providing comparator means comparing said pseuo-acceleration with each of said first and second corrected acceleration values, for producing an output signal actuating said switch;

using said switch for selectively causing the output terminal to receive one of said first and second corrected acceleration values based on the output of said comparator means, such that whichever of said first and second corrected acceleration values is closest to said pseudo-acceleration is connected to said output terminal.

2. A method for estimating a longitudinal acceleration or deceleration of a vehicle body according to claim 1, wherein in the step of providing at least one wheel speed sensor, providing a plurality of wheel speed sensors for sensing a speed of a plurality of wheels, and wherein in the step of using said pseudo-acceleration determining means to determine an pseudo-acceleration of the vehicle body, further performing the steps of:

calculating wheel accelerations or decelerations from the detected values in said wheel speed detectors, calculating rotative torques of wheels from said wheel accelerations or decelerations and inertia moments and rotational radii of wheels, dividing the sum of brake torques and said rotative torques by the rotational radii of the wheels to find thrusts of the wheels, and determining the pseudo-acceleration or deceleration based on the sum of the thrusts of all the wheels and a mass of the vehicle body.

3. A method for estimating a longitudinal acceleration or deceleration of a vehicle body according to claim 1, wherein in the step of using said pseudo-acceleration determining means to determine a pseudo-acceleration of the vehicle body, further performing the steps of:

calculating a wheel acceleration from the detected value in said wheel speed sensor, calculating a rotative torque of the wheel from said wheel acceleration and an inertia moment and rotational radii of the wheel.

4. A method for determining a longitudinal acceleration of a vehicle body, comprising the steps of:

providing a longitudinal acceleration-deceleration detector which is mounted on the vehicle body to detect an acceleration or deceleration of the vehicle body in a longitudinal direction;

detecting a longitudinal detected value using said longitudinal acceleration-deceleration detector;

providing a vertical acceleration-deceleration detector which is mounted on the vehicle body to detect an acceleration or deceleration of the vehicle body in a vertical direction;

detecting a vertical detected value using said vertical acceleration-deceleration detector;

providing at least one wheel speed sensor for sensing a speed of a wheel;

using said at least one wheel speed sensor to produce an output signal representing wheel speed of said sensed wheel;

providing at least one signal representing brake duty;

providing a pseudo-acceleration determining means for determining a pseudo-estimated acceleration of the vehicle body from said at least one wheel sensor and from said at least one signal representing brake duty;

using said pseudo-acceleration determining means to determine a pseudo-acceleration of the vehicle body from the output of said at least one wheel sensor and from said at least one signal representing brake duty;

providing a switch;

providing circuit means receiving said longitudinal detected value and said vertical detected value, for determining first and second corrected acceleration values based on said longitudinal and vertical detected value for both an upward sloped gradient and a downward sloped gradient and for comparing said pseudo-acceleration with each of said first and second corrected acceleration values, for producing an output signal actuating said switch;

using said switch to selectively cause an output terminal to receive one of said first and second corrected acceleration values depending upon which of said first and second corrected acceleration values is closest to said pseudo-acceleration.

5. An apparatus for determining a longitudinal acceleration of a vehicle body, comprising:

a longitudinal acceleration-deceleration detector mounted on the vehicle body to detect an acceleration of the vehicle body in a longitudinal direction;

a vertical acceleration-deceleration detector mounted on the vehicle body to detect an acceleration of the vehicle body in a vertical direction;

first and second correcting circuit means each receiving said longitudinal detected value and said vertical detected value, for respectively producing signals representing first and second corrected acceleration values, said first corrected acceleration value representing a corrected longitudinal detected value when the vehicle body is on an upward sloped gradient, and said second corrected acceleration value representing a corrected longitudinal detected value when the vehicle body is on a downward sloped gradient;

at least one wheel speed sensor for sensing a speed of a wheel for producing an output signal representing wheel speed of said sensed wheel;

at least one signal representing brake duty;

a pseudo-acceleration determining means for determining a pseudo-acceleration of the vehicle body from said at least one wheel sensor and from said at least one signal representing brake duty;

a switch for selectively causing an output terminal to receive only one of said first and second corrected acceleration values;

comparator means comparing said pseudo-acceleration with each of said first and second corrected acceleration values, for producing an output signal actuating said switch, to selectively cause the output terminal to receive one of said first and second corrected acceleration values based on the output of said comparator means, such that whichever of said first and second corrected acceleration values is closest to said pseudo-acceleration is connected to said output terminal.

* * * * *